US009958677B2

United States Patent
Kuzuhara et al.

(10) Patent No.: US 9,958,677 B2
(45) Date of Patent: May 1, 2018

(54) HEAD-UP DISPLAY AND MOBILE OBJECT EQUIPPED WITH HEAD-UP DISPLAY

(71) Applicant: Panasonic Intellectual Property Management Co., Ltd., Osaka (JP)

(72) Inventors: Satoshi Kuzuhara, Osaka (JP); Hiroaki Okayama, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days. days.

(21) Appl. No.: 15/383,401

(22) Filed: Dec. 19, 2016

(65) Prior Publication Data

US 2017/0184843 A1 Jun. 29, 2017

(30) Foreign Application Priority Data

Dec. 25, 2015 (JP) .................................. 2015-253885
Nov. 8, 2016 (JP) .................................. 2016-217735

(51) Int. Cl.
| G02B 27/14 | (2006.01) |
| G02B 27/01 | (2006.01) |
| G02B 17/08 | (2006.01) |
| G02B 17/00 | (2006.01) |

(52) U.S. Cl.
CPC ....... G02B 27/0101 (2013.01); G02B 17/008 (2013.01); G02B 17/0848 (2013.01); G02B 2027/015 (2013.01); G02B 2027/0123 (2013.01); G02B 2027/0145 (2013.01); G02B 2027/0147 (2013.01)

(58) Field of Classification Search
CPC .... G02B 2027/0134; G02B 2027/0136; G02B 2027/0141; G02B 2027/0145; G02B 2027/0181; G02B 2027/0183; G02B 27/01; G02B 27/0101; G02B 27/0149; G02B 27/0189; G02B 2027/013; G02B 27/0172
USPC .................................................. 359/630–631
See application file for complete search history.

(56) References Cited

U.S. PATENT DOCUMENTS

| 6,201,517 B1* | 3/2001 | Sato .................. G02B 27/2228 345/51 |
| 2015/0177520 A1 | 6/2015 | Hiraide et al. |
| 2016/0147074 A1* | 5/2016 | Kobayashi ........... G02B 3/0006 345/7 |

FOREIGN PATENT DOCUMENTS

| JP | 2008-180759 | 8/2008 |
| JP | 2015-121740 | 7/2015 |
| JP | 2016-14861 | 1/2016 |

* cited by examiner

*Primary Examiner* — William Choi
(74) *Attorney, Agent, or Firm* — Wenderoth, Lind & Ponack, L.L.P.

(57) ABSTRACT

A head-up display that allows an observer to visually recognize a virtual image in a viewpoint region of the observer is provided. The head-up display includes: a display device that has a display surface and displays an image on the display surface; and a first optical system that has a concave mirror, and a lens condensing the light and disposed between the concave mirror and the display surface. The first optical system causes a beam exiting from the display surface to form an intermediate image via the lens and the concave mirror, the intermediate image being enlarged from the image displayed on the display surface.

12 Claims, 17 Drawing Sheets

FIG. 4
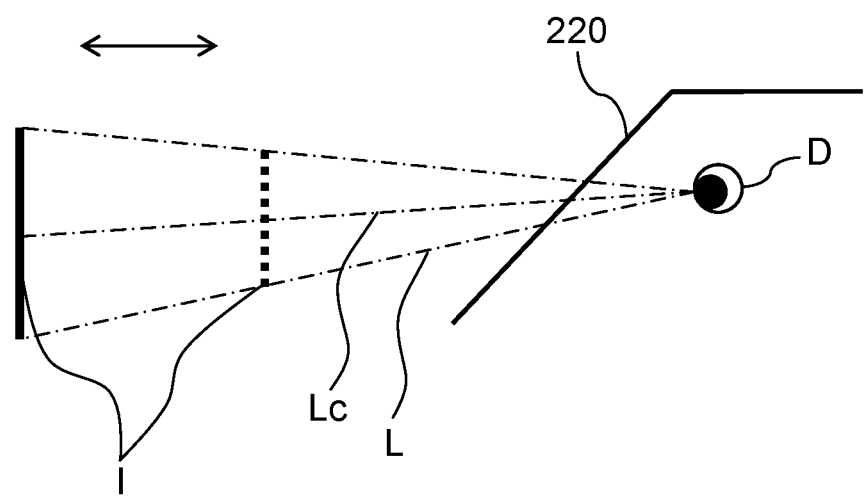
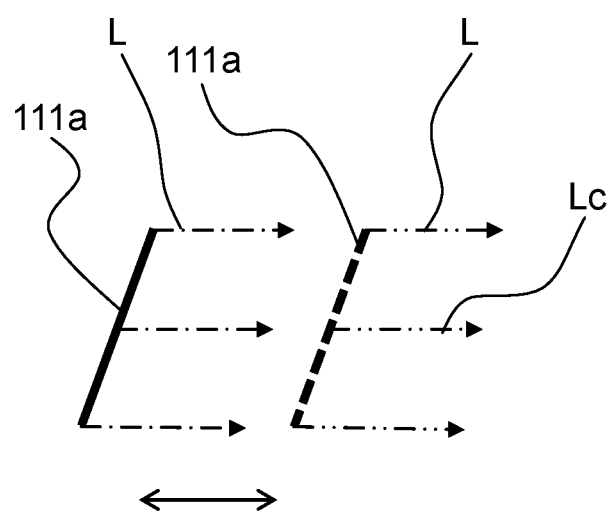

FIG. 5
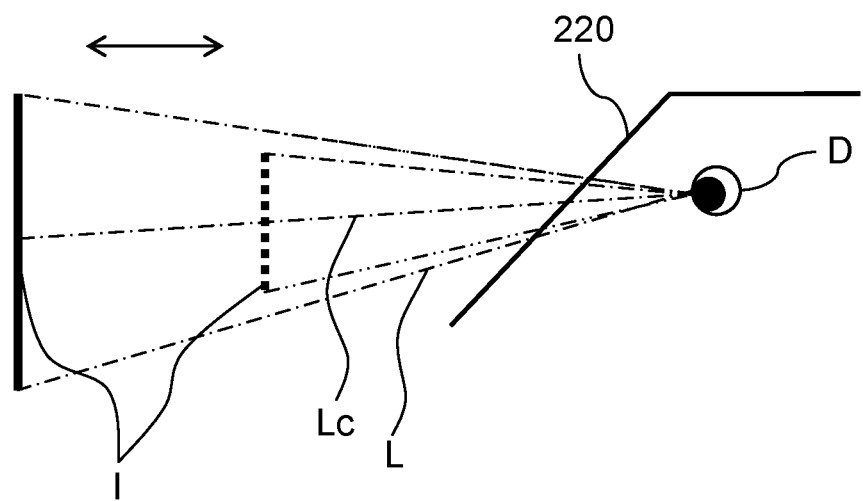
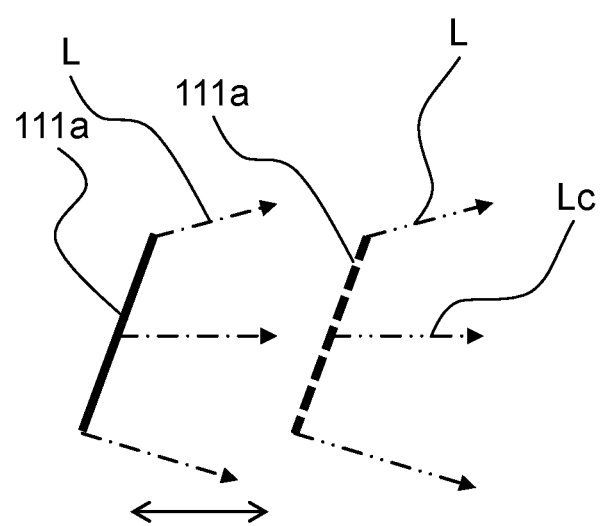

FIG. 7

| Surface number | Shape | Index of refraction | Abbe number | Eccentricity data | | | | | |
|---|---|---|---|---|---|---|---|---|---|
| | | | | X | Y | Z | ADE | BDE | CDE |
| Display surface 1 | | | | 0 | 0 | 0 | 0 | 0 | 0 |
| Lens 2 | Spherical surface | 1.492 | 57.4 | 0.014234 | 0.161118 | 1.508505 | 6.09643 | -0.53756 | 0.927698 |
| Lens 3 | Free-form surface | | | 0.061144 | 0.692105 | 6.480009 | 6.09643 | -0.53756 | 0.927698 |
| First mirror 4 | Free-form surface | | | 0.765 | 8.657 | 81.053 | -3.533 | -0.685 | 0.825 |
| Second mirror 5 | Free-form surface | | | -0.229 | 24.595 | 12.899 | 9.836 | -0.476 | 0.961 |
| Third mirror 6 | Free-form surface | | | -0.184 | 46.825 | 47.349 | 5.837 | -0.542 | 0.925 |
| Fourth mirror 7 | Free-form surface | | | -2.154 | 91.948 | -69.206 | -1.163 | -0.650 | -2.148 |
| Windshield 8 | Free-form surface | | | 40.902 | 202.753 | 222.114 | 143.484 | -5.264 | 10.636 |
| Observer 9 | | | | -66.314 | -240.160 | 919.297 | 143.484 | -5.264 | 10.636 |

FIG. 8

| Surface number | Radius of curvature |
|---|---|
| 2 | ∞ |
| 3 | -2499.6 |
| 4 | -139.5 |
| 5 | -6317.2 |
| 6 | -463.5 |
| 7 | -2518.0 |
| 8 | -430.0 |

FIG. 9

| Surface number | Polynomial coefficient | | | | | | | | |
|---|---|---|---|---|---|---|---|---|---|
| 3 | C1 | 0.000E+00 | C19 | 0.000E+00 | C37 | 0.000E+00 | C55 | 0.000E+00 |
| | C2 | 0.000E+00 | C20 | 0.000E+00 | C38 | 0.000E+00 | C56 | 0.000E+00 |
| | C3 | 0.000E+00 | C21 | 0.000E+00 | C39 | 0.000E+00 | C57 | 0.000E+00 |
| | C4 | -2.745E-03 | C22 | 0.000E+00 | C40 | 0.000E+00 | C58 | 0.000E+00 |
| | C5 | -2.709E-04 | C23 | 0.000E+00 | C41 | 0.000E+00 | C59 | 0.000E+00 |
| | C6 | 1.352E-03 | C24 | 0.000E+00 | C42 | 0.000E+00 | C60 | 0.000E+00 |
| | C7 | 1.480E-05 | C25 | 0.000E+00 | C43 | 0.000E+00 | C61 | 0.000E+00 |
| | C8 | 3.497E-04 | C26 | 0.000E+00 | C44 | 0.000E+00 | C62 | 0.000E+00 |
| | C9 | 6.096E-05 | C27 | 0.000E+00 | C45 | 0.000E+00 | C63 | 0.000E+00 |
| | C10 | 5.968E-04 | C28 | 0.000E+00 | C46 | 0.000E+00 | C64 | 0.000E+00 |
| | C11 | -1.911E-05 | C29 | 0.000E+00 | C47 | 0.000E+00 | C65 | 0.000E+00 |
| | C12 | 2.037E-07 | C30 | 0.000E+00 | C48 | 0.000E+00 | C66 | 0.000E+00 |
| | C13 | -4.285E-05 | C31 | 0.000E+00 | C49 | 0.000E+00 | | |
| | C14 | -7.628E-06 | C32 | 0.000E+00 | C50 | 0.000E+00 | | |
| | C15 | -6.880E-06 | C33 | 0.000E+00 | C51 | 0.000E+00 | | |
| | C16 | 0.000E+00 | C34 | 0.000E+00 | C52 | 0.000E+00 | | |
| | C17 | 0.000E+00 | C35 | 0.000E+00 | C53 | 0.000E+00 | | |
| | C18 | 0.000E+00 | C36 | 0.000E+00 | C54 | 0.000E+00 | | |
| 4 | C1 | 0.000E+00 | C19 | -4.352E-10 | C37 | 0.000E+00 | C55 | 0.000E+00 |
| | C2 | 0.000E+00 | C20 | -3.567E-10 | C38 | 0.000E+00 | C56 | 0.000E+00 |
| | C3 | 0.000E+00 | C21 | -2.709E-09 | C39 | 0.000E+00 | C57 | 0.000E+00 |
| | C4 | -2.387E-03 | C22 | -2.035E-11 | C40 | 0.000E+00 | C58 | 0.000E+00 |
| | C5 | 7.009E-06 | C23 | -3.485E-13 | C41 | 0.000E+00 | C59 | 0.000E+00 |
| | C6 | -1.206E-03 | C24 | -5.171E-11 | C42 | 0.000E+00 | C60 | 0.000E+00 |
| | C7 | 9.879E-08 | C25 | 1.497E-13 | C43 | 0.000E+00 | C61 | 0.000E+00 |
| | C8 | 8.787E-07 | C26 | -5.457E-11 | C44 | 0.000E+00 | C62 | 0.000E+00 |
| | C9 | 8.110E-07 | C27 | 8.756E-12 | C45 | 0.000E+00 | C63 | 0.000E+00 |
| | C10 | -7.239E-07 | C28 | 6.963E-12 | C46 | 0.000E+00 | C64 | 0.000E+00 |
| | C11 | -1.668E-07 | C29 | 0.000E+00 | C47 | 0.000E+00 | C65 | 0.000E+00 |
| | C12 | 2.217E-09 | C30 | 0.000E+00 | C48 | 0.000E+00 | C66 | 0.000E+00 |
| | C13 | -2.150E-07 | C31 | 0.000E+00 | C49 | 0.000E+00 | | |
| | C14 | 1.463E-09 | C32 | 0.000E+00 | C50 | 0.000E+00 | | |
| | C15 | -1.363E-08 | C33 | 0.000E+00 | C51 | 0.000E+00 | | |
| | C16 | 7.377E-12 | C34 | 0.000E+00 | C52 | 0.000E+00 | | |
| | C17 | 1.513E-10 | C35 | 0.000E+00 | C53 | 0.000E+00 | | |
| | C18 | 7.821E-11 | C36 | 0.000E+00 | C54 | 0.000E+00 | | |

FIG. 10

| Surface number | Polynomial coefficient | | | | | | |
|---|---|---|---|---|---|---|---|
| 5 | C1 | 0.000E+00 | C19 | -6.037E-08 | C37 | 0.000E+00 | C55 | 0.000E+00 |
| | C2 | 0.000E+00 | C20 | 4.134E-09 | C38 | 0.000E+00 | C56 | 0.000E+00 |
| | C3 | 0.000E+00 | C21 | 3.256E-08 | C39 | 0.000E+00 | C57 | 0.000E+00 |
| | C4 | -3.689E-03 | C22 | -1.438E-09 | C40 | 0.000E+00 | C58 | 0.000E+00 |
| | C5 | -5.794E-06 | C23 | 1.470E-10 | C41 | 0.000E+00 | C59 | 0.000E+00 |
| | C6 | 1.434E-03 | C24 | -3.247E-09 | C42 | 0.000E+00 | C60 | 0.000E+00 |
| | C7 | -3.881E-07 | C25 | 1.247E-10 | C43 | 0.000E+00 | C61 | 0.000E+00 |
| | C8 | -4.876E-05 | C26 | -9.096E-10 | C44 | 0.000E+00 | C62 | 0.000E+00 |
| | C9 | 5.559E-06 | C27 | 2.614E-10 | C45 | 0.000E+00 | C63 | 0.000E+00 |
| | C10 | -2.268E-05 | C28 | -1.921E-09 | C46 | 0.000E+00 | C64 | 0.000E+00 |
| | C11 | -2.442E-06 | C29 | 0.000E+00 | C47 | 0.000E+00 | C65 | 0.000E+00 |
| | C12 | 8.724E-08 | C30 | 0.000E+00 | C48 | 0.000E+00 | C66 | 0.000E+00 |
| | C13 | -1.989E-06 | C31 | 0.000E+00 | C49 | 0.000E+00 | | |
| | C14 | 1.172E-07 | C32 | 0.000E+00 | C50 | 0.000E+00 | | |
| | C15 | -1.470E-07 | C33 | 0.000E+00 | C51 | 0.000E+00 | | |
| | C16 | 2.736E-09 | C34 | 0.000E+00 | C52 | 0.000E+00 | | |
| | C17 | -8.263E-08 | C35 | 0.000E+00 | C53 | 0.000E+00 | | |
| | C18 | 9.688E-09 | C36 | 0.000E+00 | C54 | 0.000E+00 | | |
| 6 | C1 | 0.000E+00 | C19 | 2.017E-08 | C37 | 0.000E+00 | C55 | 0.000E+00 |
| | C2 | 0.000E+00 | C20 | -1.564E-08 | C38 | 0.000E+00 | C56 | 0.000E+00 |
| | C3 | 0.000E+00 | C21 | 1.039E-09 | C39 | 0.000E+00 | C57 | 0.000E+00 |
| | C4 | 2.974E-03 | C22 | 1.583E-11 | C40 | 0.000E+00 | C58 | 0.000E+00 |
| | C5 | -1.081E-04 | C23 | -1.649E-11 | C41 | 0.000E+00 | C59 | 0.000E+00 |
| | C6 | 6.440E-03 | C24 | -4.112E-10 | C42 | 0.000E+00 | C60 | 0.000E+00 |
| | C7 | -3.140E-07 | C25 | 4.379E-10 | C43 | 0.000E+00 | C61 | 0.000E+00 |
| | C8 | -7.681E-05 | C26 | 5.874E-10 | C44 | 0.000E+00 | C62 | 0.000E+00 |
| | C9 | 7.411E-06 | C27 | -7.857E-10 | C45 | 0.000E+00 | C63 | 0.000E+00 |
| | C10 | -3.094E-05 | C28 | -4.677E-10 | C46 | 0.000E+00 | C64 | 0.000E+00 |
| | C11 | -2.131E-07 | C29 | 0.000E+00 | C47 | 0.000E+00 | C65 | 0.000E+00 |
| | C12 | 5.881E-08 | C30 | 0.000E+00 | C48 | 0.000E+00 | C66 | 0.000E+00 |
| | C13 | 5.825E-07 | C31 | 0.000E+00 | C49 | 0.000E+00 | | |
| | C14 | 3.781E-07 | C32 | 0.000E+00 | C50 | 0.000E+00 | | |
| | C15 | -1.580E-06 | C33 | 0.000E+00 | C51 | 0.000E+00 | | |
| | C16 | 9.496E-11 | C34 | 0.000E+00 | C52 | 0.000E+00 | | |
| | C17 | 1.247E-08 | C35 | 0.000E+00 | C53 | 0.000E+00 | | |
| | C18 | -8.722E-09 | C36 | 0.000E+00 | C54 | 0.000E+00 | | |

FIG. 11

| Surface number | Polynomial coefficient | | | | | | |
|---|---|---|---|---|---|---|---|
| 7 | C1 | 0.000E+00 | C19 | 2.275E-12 | C37 | 0.000E+00 | C55 | 0.000E+00 |
| | C2 | 0.000E+00 | C20 | 8.057E-12 | C38 | 0.000E+00 | C56 | 0.000E+00 |
| | C3 | 0.000E+00 | C21 | 5.734E-12 | C39 | 0.000E+00 | C57 | 0.000E+00 |
| | C4 | 1.954E-03 | C22 | -9.728E-15 | C40 | 0.000E+00 | C58 | 0.000E+00 |
| | C5 | -1.355E-06 | C23 | -1.717E-14 | C41 | 0.000E+00 | C59 | 0.000E+00 |
| | C6 | 1.842E-03 | C24 | 3.330E-14 | C42 | 0.000E+00 | C60 | 0.000E+00 |
| | C7 | 1.188E-07 | C25 | -3.399E-14 | C43 | 0.000E+00 | C61 | 0.000E+00 |
| | C8 | -2.376E-06 | C26 | 5.023E-14 | C44 | 0.000E+00 | C62 | 0.000E+00 |
| | C9 | 7.207E-08 | C27 | -1.592E-13 | C45 | 0.000E+00 | C63 | 0.000E+00 |
| | C10 | -2.332E-06 | C28 | 2.567E-13 | C46 | 0.000E+00 | C64 | 0.000E+00 |
| | C11 | 6.038E-10 | C29 | 0.000E+00 | C47 | 0.000E+00 | C65 | 0.000E+00 |
| | C12 | -1.364E-10 | C30 | 0.000E+00 | C48 | 0.000E+00 | C66 | 0.000E+00 |
| | C13 | 3.195E-09 | C31 | 0.000E+00 | C49 | 0.000E+00 | | |
| | C14 | -2.432E-10 | C32 | 0.000E+00 | C50 | 0.000E+00 | | |
| | C15 | 1.639E-09 | C33 | 0.000E+00 | C51 | 0.000E+00 | | |
| | C16 | 4.589E-13 | C34 | 0.000E+00 | C52 | 0.000E+00 | | |
| | C17 | -6.539E-12 | C35 | 0.000E+00 | C53 | 0.000E+00 | | |
| | C18 | 3.924E-12 | C36 | 0.000E+00 | C54 | 0.000E+00 | | |
| 8 | C1 | 0.000E+00 | C19 | 1.510E-12 | C37 | 1.800E-21 | C55 | 0.000E+00 |
| | C2 | 0.000E+00 | C20 | 6.210E-12 | C38 | 1.600E-21 | C56 | 0.000E+00 |
| | C3 | 0.000E+00 | C21 | 1.000E-11 | C39 | -1.240E-20 | C57 | 0.000E+00 |
| | C4 | 1.977E-03 | C22 | 4.270E-15 | C40 | 7.840E-21 | C58 | 0.000E+00 |
| | C5 | -2.126E-06 | C23 | -3.900E-15 | C41 | -2.190E-20 | C59 | 0.000E+00 |
| | C6 | 1.842E-03 | C24 | 5.780E-15 | C42 | -5.710E-20 | C60 | 0.000E+00 |
| | C7 | 9.078E-08 | C25 | -1.460E-14 | C43 | 5.620E-20 | C61 | 0.000E+00 |
| | C8 | -2.346E-06 | C26 | 6.040E-15 | C44 | 8.070E-23 | C62 | 0.000E+00 |
| | C9 | 1.192E-07 | C27 | 4.910E-15 | C45 | -3.960E-21 | C63 | 0.000E+00 |
| | C10 | -1.571E-06 | C28 | -2.710E-14 | C46 | 0.000E+00 | C64 | 0.000E+00 |
| | C11 | 6.871E-10 | C29 | -1.110E-18 | C47 | 0.000E+00 | C65 | 0.000E+00 |
| | C12 | 2.698E-11 | C30 | 4.430E-18 | C48 | 0.000E+00 | C66 | 0.000E+00 |
| | C13 | 5.404E-09 | C31 | 3.850E-17 | C49 | 0.000E+00 | | |
| | C14 | 1.585E-09 | C32 | 9.940E-17 | C50 | 0.000E+00 | | |
| | C15 | -4.177E-10 | C33 | 2.290E-17 | C51 | 0.000E+00 | | |
| | C16 | 6.210E-13 | C34 | -5.390E-17 | C52 | 0.000E+00 | | |
| | C17 | -1.146E-11 | C35 | -4.830E-17 | C53 | 0.000E+00 | | |
| | C18 | -6.707E-13 | C36 | 3.040E-17 | C54 | 0.000E+00 | | |

FIG. 12

| Surface number | Shape | Index of refraction | Abbe number | Eccentricity data | | | | | |
|---|---|---|---|---|---|---|---|---|---|
| | | | | X | Y | Z | ADE | BDE | CDE |
| Display surface 1 | | | | 0 | 0 | 0 | 0 | 0 | 0 |
| Lens 2 | Spherical surface | 1.492 | 57.4 | 0.058819 | 1.15737 | 11.6871 | 5.655546 | -0.28695 | 0.927698 |
| Lens 3 | Free-form surface | | | 0.08386 | 1.650102 | 16.66269 | 5.655546 | -0.28695 | 0.927698 |
| First mirror 4 | Free-form surface | | | 0.384 | 7.563 | 76.370 | -4.318 | -0.443 | 0.864 |
| Second mirror 5 | Free-form surface | | | -0.332 | 24.843 | 8.540 | 8.706 | -0.237 | 0.942 |
| Third mirror 6 | Free-form surface | | | -0.439 | 46.389 | 43.422 | 4.706 | -0.302 | 0.923 |
| Fourth mirror 7 | Free-form surface | | | -1.940 | 93.801 | -72.227 | -2.293 | -0.412 | -2.121 |
| Windshield 8 | Free-form surface | | | 39.860 | 198.850 | 221.399 | 142.338 | -5.443 | 10.476 |
| Observer 9 | | | | -70.087 | -257.764 | 909.256 | 142.338 | -5.443 | 10.476 |

FIG. 13

| Surface number | Radius of curvature |
|---|---|
| 2 | ∞ |
| 3 | -1065.7 |
| 4 | -131.1 |
| 5 | -1658.4 |
| 6 | -388.8 |
| 7 | -2160.2 |
| 8 | -430.0 |

FIG. 14

| Surface number | Polynomial coefficient | | | | | | | | |
|---|---|---|---|---|---|---|---|---|---|
| 3 | C1 | 0.000E+00 | C19 | 0.000E+00 | C37 | 0.000E+00 | C55 | 0.000E+00 |
| | C2 | 0.000E+00 | C20 | 0.000E+00 | C38 | 0.000E+00 | C56 | 0.000E+00 |
| | C3 | 0.000E+00 | C21 | 0.000E+00 | C39 | 0.000E+00 | C57 | 0.000E+00 |
| | C4 | -7.308E-03 | C22 | 0.000E+00 | C40 | 0.000E+00 | C58 | 0.000E+00 |
| | C5 | -9.554E-04 | C23 | 0.000E+00 | C41 | 0.000E+00 | C59 | 0.000E+00 |
| | C6 | -2.543E-03 | C24 | 0.000E+00 | C42 | 0.000E+00 | C60 | 0.000E+00 |
| | C7 | 2.690E-05 | C25 | 0.000E+00 | C43 | 0.000E+00 | C61 | 0.000E+00 |
| | C8 | 2.868E-05 | C26 | 0.000E+00 | C44 | 0.000E+00 | C62 | 0.000E+00 |
| | C9 | -8.294E-05 | C27 | 0.000E+00 | C45 | 0.000E+00 | C63 | 0.000E+00 |
| | C10 | -3.921E-04 | C28 | 0.000E+00 | C46 | 0.000E+00 | C64 | 0.000E+00 |
| | C11 | -3.830E-06 | C29 | 0.000E+00 | C47 | 0.000E+00 | C65 | 0.000E+00 |
| | C12 | 3.019E-06 | C30 | 0.000E+00 | C48 | 0.000E+00 | C66 | 0.000E+00 |
| | C13 | 9.928E-06 | C31 | 0.000E+00 | C49 | 0.000E+00 | | |
| | C14 | 1.012E-05 | C32 | 0.000E+00 | C50 | 0.000E+00 | | |
| | C15 | 8.323E-06 | C33 | 0.000E+00 | C51 | 0.000E+00 | | |
| | C16 | 0.000E+00 | C34 | 0.000E+00 | C52 | 0.000E+00 | | |
| | C17 | 0.000E+00 | C35 | 0.000E+00 | C53 | 0.000E+00 | | |
| | C18 | 0.000E+00 | C36 | 0.000E+00 | C54 | 0.000E+00 | | |
| 4 | C1 | 0.000E+00 | C19 | 5.790E-10 | C37 | 0.000E+00 | C55 | 0.000E+00 |
| | C2 | 0.000E+00 | C20 | -1.532E-11 | C38 | 0.000E+00 | C56 | 0.000E+00 |
| | C3 | 0.000E+00 | C21 | 5.492E-10 | C39 | 0.000E+00 | C57 | 0.000E+00 |
| | C4 | -2.301E-03 | C22 | -1.018E-11 | C40 | 0.000E+00 | C58 | 0.000E+00 |
| | C5 | 2.397E-05 | C23 | -3.358E-12 | C41 | 0.000E+00 | C59 | 0.000E+00 |
| | C6 | -1.328E-03 | C24 | -4.126E-11 | C42 | 0.000E+00 | C60 | 0.000E+00 |
| | C7 | 8.989E-08 | C25 | -1.196E-11 | C43 | 0.000E+00 | C61 | 0.000E+00 |
| | C8 | 9.023E-07 | C26 | -2.886E-11 | C44 | 0.000E+00 | C62 | 0.000E+00 |
| | C9 | 8.277E-07 | C27 | -3.013E-11 | C45 | 0.000E+00 | C63 | 0.000E+00 |
| | C10 | 1.120E-06 | C28 | 4.634E-11 | C46 | 0.000E+00 | C64 | 0.000E+00 |
| | C11 | -1.684E-07 | C29 | 0.000E+00 | C47 | 0.000E+00 | C65 | 0.000E+00 |
| | C12 | 9.575E-09 | C30 | 0.000E+00 | C48 | 0.000E+00 | C66 | 0.000E+00 |
| | C13 | -2.376E-07 | C31 | 0.000E+00 | C49 | 0.000E+00 | | |
| | C14 | 1.341E-08 | C32 | 0.000E+00 | C50 | 0.000E+00 | | |
| | C15 | -9.253E-08 | C33 | 0.000E+00 | C51 | 0.000E+00 | | |
| | C16 | -3.932E-11 | C34 | 0.000E+00 | C52 | 0.000E+00 | | |
| | C17 | -1.045E-11 | C35 | 0.000E+00 | C53 | 0.000E+00 | | |
| | C18 | 1.624E-10 | C36 | 0.000E+00 | C54 | 0.000E+00 | | |

FIG. 15

| Surface number | Polynomial coefficient | | | | | | | | | |
|---|---|---|---|---|---|---|---|---|---|---|
| 5 | C1 | 0.000E+00 | C19 | 5.790E-10 | C37 | 0.000E+00 | C55 | 0.000E+00 | | |
| | C2 | 0.000E+00 | C20 | -1.532E-11 | C38 | 0.000E+00 | C56 | 0.000E+00 | | |
| | C3 | 0.000E+00 | C21 | 5.492E-10 | C39 | 0.000E+00 | C57 | 0.000E+00 | | |
| | C4 | -3.896E-03 | C22 | -1.018E-11 | C40 | 0.000E+00 | C58 | 0.000E+00 | | |
| | C5 | 1.191E-04 | C23 | -3.358E-12 | C41 | 0.000E+00 | C59 | 0.000E+00 | | |
| | C6 | 9.152E-04 | C24 | -4.126E-11 | C42 | 0.000E+00 | C60 | 0.000E+00 | | |
| | C7 | -3.856E-07 | C25 | -1.196E-11 | C43 | 0.000E+00 | C61 | 0.000E+00 | | |
| | C8 | -5.932E-05 | C26 | -2.886E-11 | C44 | 0.000E+00 | C62 | 0.000E+00 | | |
| | C9 | 8.561E-06 | C27 | -3.013E-11 | C45 | 0.000E+00 | C63 | 0.000E+00 | | |
| | C10 | -2.113E-05 | C28 | 4.634E-11 | C46 | 0.000E+00 | C64 | 0.000E+00 | | |
| | C11 | -1.274E-06 | C29 | 0.000E+00 | C47 | 0.000E+00 | C65 | 0.000E+00 | | |
| | C12 | -6.939E-08 | C30 | 0.000E+00 | C48 | 0.000E+00 | C66 | 0.000E+00 | | |
| | C13 | -1.804E-06 | C31 | 0.000E+00 | C49 | 0.000E+00 | | | | |
| | C14 | -3.743E-09 | C32 | 0.000E+00 | C50 | 0.000E+00 | | | | |
| | C15 | -4.297E-07 | C33 | 0.000E+00 | C51 | 0.000E+00 | | | | |
| | C16 | 1.656E-10 | C34 | 0.000E+00 | C52 | 0.000E+00 | | | | |
| | C17 | -1.110E-07 | C35 | 0.000E+00 | C53 | 0.000E+00 | | | | |
| | C18 | 1.296E-08 | C36 | 0.000E+00 | C54 | 0.000E+00 | | | | |
| 6 | C1 | 0.000E+00 | C19 | 1.380E-08 | C37 | 0.000E+00 | C55 | 0.000E+00 | | |
| | C2 | 0.000E+00 | C20 | -4.003E-08 | C38 | 0.000E+00 | C56 | 0.000E+00 | | |
| | C3 | 0.000E+00 | C21 | -1.438E-08 | C39 | 0.000E+00 | C57 | 0.000E+00 | | |
| | C4 | -3.896E-03 | C22 | 1.694E-11 | C40 | 0.000E+00 | C58 | 0.000E+00 | | |
| | C5 | 1.191E-04 | C23 | -4.047E-11 | C41 | 0.000E+00 | C59 | 0.000E+00 | | |
| | C6 | 9.152E-04 | C24 | -4.578E-10 | C42 | 0.000E+00 | C60 | 0.000E+00 | | |
| | C7 | -3.856E-07 | C25 | 4.367E-10 | C43 | 0.000E+00 | C61 | 0.000E+00 | | |
| | C8 | -5.932E-05 | C26 | 6.989E-10 | C44 | 0.000E+00 | C62 | 0.000E+00 | | |
| | C9 | 8.561E-06 | C27 | -2.117E-10 | C45 | 0.000E+00 | C63 | 0.000E+00 | | |
| | C10 | -2.113E-05 | C28 | -7.679E-10 | C46 | 0.000E+00 | C64 | 0.000E+00 | | |
| | C11 | -1.274E-06 | C29 | 0.000E+00 | C47 | 0.000E+00 | C65 | 0.000E+00 | | |
| | C12 | -6.939E-08 | C30 | 0.000E+00 | C48 | 0.000E+00 | C66 | 0.000E+00 | | |
| | C13 | -1.804E-06 | C31 | 0.000E+00 | C49 | 0.000E+00 | | | | |
| | C14 | -3.743E-09 | C32 | 0.000E+00 | C50 | 0.000E+00 | | | | |
| | C15 | -4.297E-07 | C33 | 0.000E+00 | C51 | 0.000E+00 | | | | |
| | C16 | 1.656E-10 | C34 | 0.000E+00 | C52 | 0.000E+00 | | | | |
| | C17 | -1.110E-07 | C35 | 0.000E+00 | C53 | 0.000E+00 | | | | |
| | C18 | 1.296E-08 | C36 | 0.000E+00 | C54 | 0.000E+00 | | | | |

FIG. 16

| Surface number | Polynomial coefficient | | | | | | | | | |
|---|---|---|---|---|---|---|---|---|---|---|
| 7 | C1 | 0.000E+00 | C19 | 1.380E-08 | C37 | 0.000E+00 | C55 | 0.000E+00 |
| | C2 | 0.000E+00 | C20 | -4.003E-08 | C38 | 0.000E+00 | C56 | 0.000E+00 |
| | C3 | 0.000E+00 | C21 | -1.438E-08 | C39 | 0.000E+00 | C57 | 0.000E+00 |
| | C4 | 1.977E-03 | C22 | 1.694E-11 | C40 | 0.000E+00 | C58 | 0.000E+00 |
| | C5 | -2.126E-06 | C23 | -4.047E-11 | C41 | 0.000E+00 | C59 | 0.000E+00 |
| | C6 | 1.842E-03 | C24 | -4.578E-10 | C42 | 0.000E+00 | C60 | 0.000E+00 |
| | C7 | 9.078E-08 | C25 | 4.367E-10 | C43 | 0.000E+00 | C61 | 0.000E+00 |
| | C8 | -2.346E-06 | C26 | 6.989E-10 | C44 | 0.000E+00 | C62 | 0.000E+00 |
| | C9 | 1.192E-07 | C27 | -2.117E-10 | C45 | 0.000E+00 | C63 | 0.000E+00 |
| | C10 | -1.571E-06 | C28 | -7.679E-10 | C46 | 0.000E+00 | C64 | 0.000E+00 |
| | C11 | 6.871E-10 | C29 | 0.000E+00 | C47 | 0.000E+00 | C65 | 0.000E+00 |
| | C12 | 2.698E-11 | C30 | 0.000E+00 | C48 | 0.000E+00 | C66 | 0.000E+00 |
| | C13 | 5.404E-09 | C31 | 0.000E+00 | C49 | 0.000E+00 | | |
| | C14 | 1.585E-09 | C32 | 0.000E+00 | C50 | 0.000E+00 | | |
| | C15 | -4.177E-10 | C33 | 0.000E+00 | C51 | 0.000E+00 | | |
| | C16 | 6.210E-13 | C34 | 0.000E+00 | C52 | 0.000E+00 | | |
| | C17 | -1.146E-11 | C35 | 0.000E+00 | C53 | 0.000E+00 | | |
| | C18 | -6.707E-13 | C36 | 0.000E+00 | C54 | 0.000E+00 | | |
| 8 | C1 | 0.000E+00 | C19 | 1.510E-12 | C37 | 1.800E-21 | C55 | 0.000E+00 |
| | C2 | 0.000E+00 | C20 | 6.210E-12 | C38 | 1.600E-21 | C56 | 0.000E+00 |
| | C3 | 0.000E+00 | C21 | 1.000E-11 | C39 | -1.240E-20 | C57 | 0.000E+00 |
| | C4 | 1.977E-03 | C22 | 4.270E-15 | C40 | 7.840E-21 | C58 | 0.000E+00 |
| | C5 | -2.126E-06 | C23 | -3.900E-15 | C41 | -2.190E-20 | C59 | 0.000E+00 |
| | C6 | 1.842E-03 | C24 | 5.780E-15 | C42 | -5.710E-20 | C60 | 0.000E+00 |
| | C7 | 9.078E-08 | C25 | -1.460E-14 | C43 | 5.620E-20 | C61 | 0.000E+00 |
| | C8 | -2.346E-06 | C26 | 6.040E-15 | C44 | 8.070E-23 | C62 | 0.000E+00 |
| | C9 | 1.192E-07 | C27 | 4.910E-15 | C45 | -3.960E-21 | C63 | 0.000E+00 |
| | C10 | -1.571E-06 | C28 | -2.710E-14 | C46 | 0.000E+00 | C64 | 0.000E+00 |
| | C11 | 6.871E-10 | C29 | -1.110E-18 | C47 | 0.000E+00 | C65 | 0.000E+00 |
| | C12 | 2.698E-11 | C30 | 4.430E-18 | C48 | 0.000E+00 | C66 | 0.000E+00 |
| | C13 | 5.404E-09 | C31 | 3.850E-17 | C49 | 0.000E+00 | | |
| | C14 | 1.585E-09 | C32 | 9.940E-17 | C50 | 0.000E+00 | | |
| | C15 | -4.177E-10 | C33 | 2.290E-17 | C51 | 0.000E+00 | | |
| | C16 | 6.210E-13 | C34 | -5.390E-17 | C52 | 0.000E+00 | | |
| | C17 | -1.146E-11 | C35 | -4.830E-17 | C53 | 0.000E+00 | | |
| | C18 | -6.707E-13 | C36 | 3.040E-17 | C54 | 0.000E+00 | | |

FIG. 17

|  |  | Example 1 | Example 2 |
|---|---|---|---|
| Virtual image size | X | 700.0 | 700.0 |
|  | Y | 300.0 | 300.0 |
| Distance from observer to virtual image |  | 4000.0 | 4000.0 |

HEAD-UP DISPLAY AND MOBILE OBJECT EQUIPPED WITH HEAD-UP DISPLAY

BACKGROUND

1. Technical Field

The present disclosure relates to a head-up display that allows an observer to visually recognize a virtual image, and a mobile object equipped with the head-up display.

2. Description of the Related Art

Unexamined Japanese Patent Publication No. 2008-180759 discloses a display device that realizes stereoscopic display. The display device includes: a display panel which is an image forming unit that forms an image; an image-formation optical system that optically forms an image of the image formed by the image forming unit; and an image-formation position varying unit that is provided on the input side of the image-formation optical system and varies the position of the image optically formed by the image-formation optical system. The image-formation position varying unit includes a relay optical system that forms an intermediate image between the image forming unit and the image-formation optical system. By the relay optical system varying the position of the intermediate image, respective positions of a plurality of images successively switched by the image forming unit are varied.

SUMMARY

A head-up display of the present disclosure allows an observer to visually recognize a virtual image in a viewpoint region of the observer. The head-up display includes a display device and a first optical system. The display device has a display surface and displays an image on the display surface. The first optical system has a concave mirror, and a lens condensing the light and disposed between the concave mirror and the display surface. The first optical system causes a beam exiting from the display surface to form an intermediate image, which is enlarged from the image displayed on the display surface, via the lens and the concave mirror.

A mobile object of the present disclosure includes the head-up display and a windshield.

The head-up display of the present disclosure can present, while being small in size, a large-screen virtual image.

BRIEF DESCRIPTION OF THE DRAWINGS

FIG. 4 is a diagram showing a relationship between an angle of a beam exiting from a display surface of the screen and virtual image I;

FIG. 5 is a diagram showing the relationship between the angle of the beam exiting from the display surface of the screen and virtual image I;

FIG. 7 is a table showing eccentricity data of surfaces in an optical system of Example 1 (corresponding to the first exemplary embodiment);

FIG. 8 is a table showing radius of curvature of the surfaces in the optical system of Example 1 (corresponding to the first exemplary embodiment);

FIG. 9 is a table showing data of free-form surfaces in the optical system of Example 1 (corresponding to the first exemplary embodiment);

FIG. 10 is a table showing data of free-form surfaces in the optical system of Example 1 (corresponding to the first exemplary embodiment);

FIG. 11 is a table showing data of free-form surfaces in the optical system of Example 1 (corresponding to the first exemplary embodiment);

FIG. 12 is a table showing eccentricity data of surfaces in an optical system of Example 2 (corresponding to the second exemplary embodiment);

FIG. 13 is a table showing radius of curvature of the surfaces in the optical system of Example 2 (corresponding to the second exemplary embodiment);

FIG. 14 is a table showing data of free-form surfaces in the optical system of Example 2 (corresponding to the second exemplary embodiment);

FIG. 15 is a table showing data of free-form surfaces in the optical system of Example 2 (corresponding to the second exemplary embodiment);

FIG. 16 is a table showing data of free-form surfaces in the optical system of Example 2 (corresponding to the second exemplary embodiment); and FIG. 17 is a table showing data of the head-up display according to each of the first and second exemplary embodiments.

DETAILED DESCRIPTION

In the following, with reference to the drawings as appropriate, a detailed description will be given of exemplary embodiments. Note that, an excessively detailed description may be omitted. For example, a detailed description of a well-known matter or a repetitive description of substantially identical structures may be omitted. This is to avoid unnecessary redundancy in the following description, and to facilitate understanding of a person skilled in the art.

Note that, the accompanying drawings and the following description are provided for a person skilled in the art to fully understand the present disclosure, and they are not intended to limit the subject disclosed in the scope of claims for patent.

First Exemplary Embodiment

In the following, with reference to FIGS. 1 to 5, a description will be given of the first exemplary embodiment.

[1-1. Structure]

[1-1-1. Overall Structure of Head-Up Display and Mobile Object]

Figure 1:
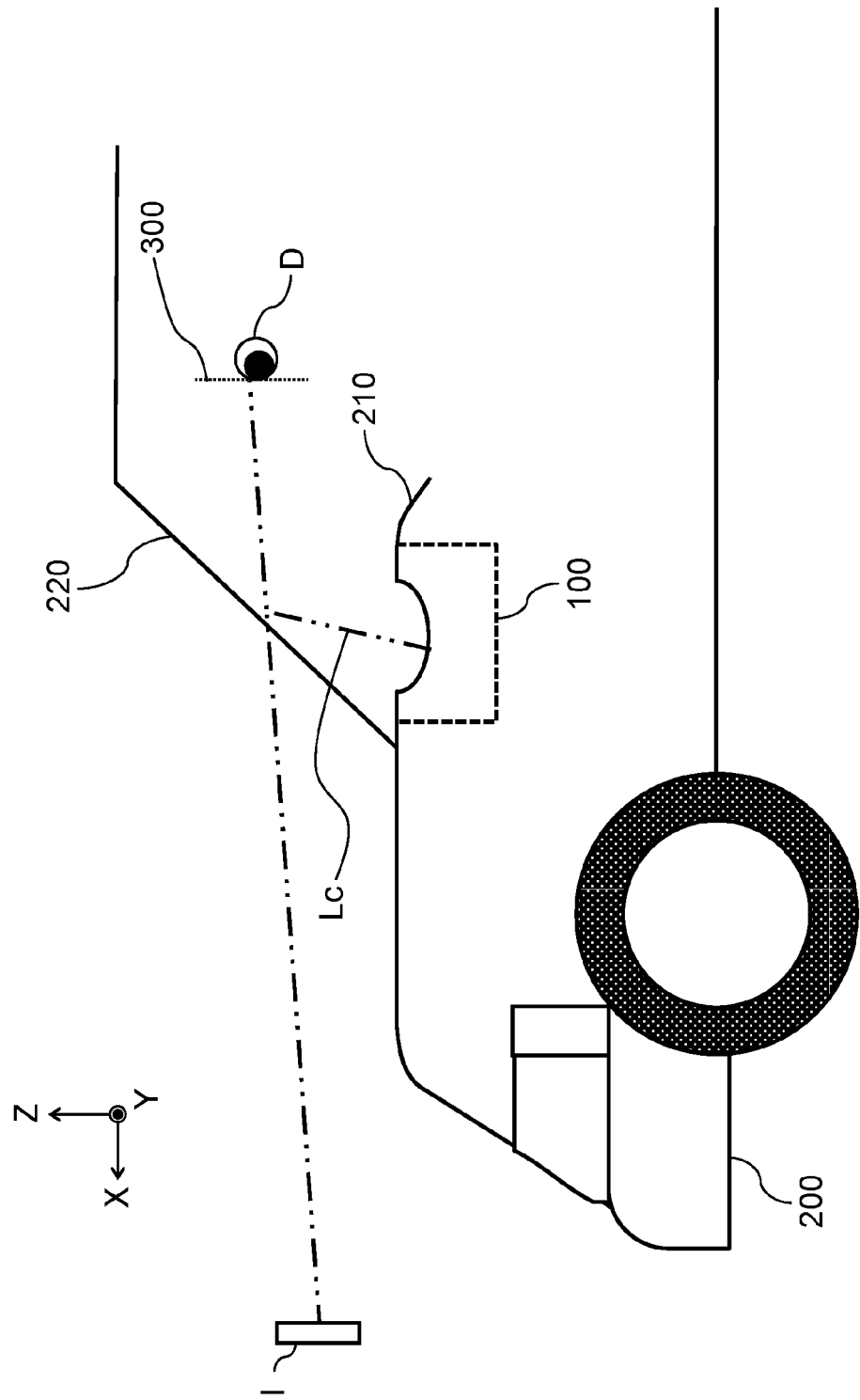
FIG. 1 is a schematic cross-sectional diagram of a mobile object equipped with a head-up display of the present disclosure.

FIG. 1 is a schematic cross-sectional diagram of vehicle 200 as a mobile object equipped with head-up display 100 of the present disclosure. Vehicle 200 includes dashboard 210 and windshield 220. Dashboard 210 is disposed below windshield 220. Observer D is riding in vehicle 200.

As shown in FIG. 1, head-up display 100 is disposed inside dashboard 210. Head-up display 100 reflects a beam from an image displayed on display device 110 (see FIG. 2) via windshield 220 to guide the beam to viewpoint region 300 of observer D, thereby presenting virtual image I to observer D. That is, observer D visually recognizes an image projected by head-up display 100 on windshield 220 as virtual image I. Note that, viewpoint region 300 is also referred to as an eyebox. Viewpoint region 300 is a region in which the viewpoint of observer D positions where observer D can visually recognize complete virtual image I. In the present disclosure, unless otherwise specified, the viewpoint of observer D is positioned at the center of viewpoint region 300.

[1-1-2. Structure of Head-Up Display]

Figure 2:
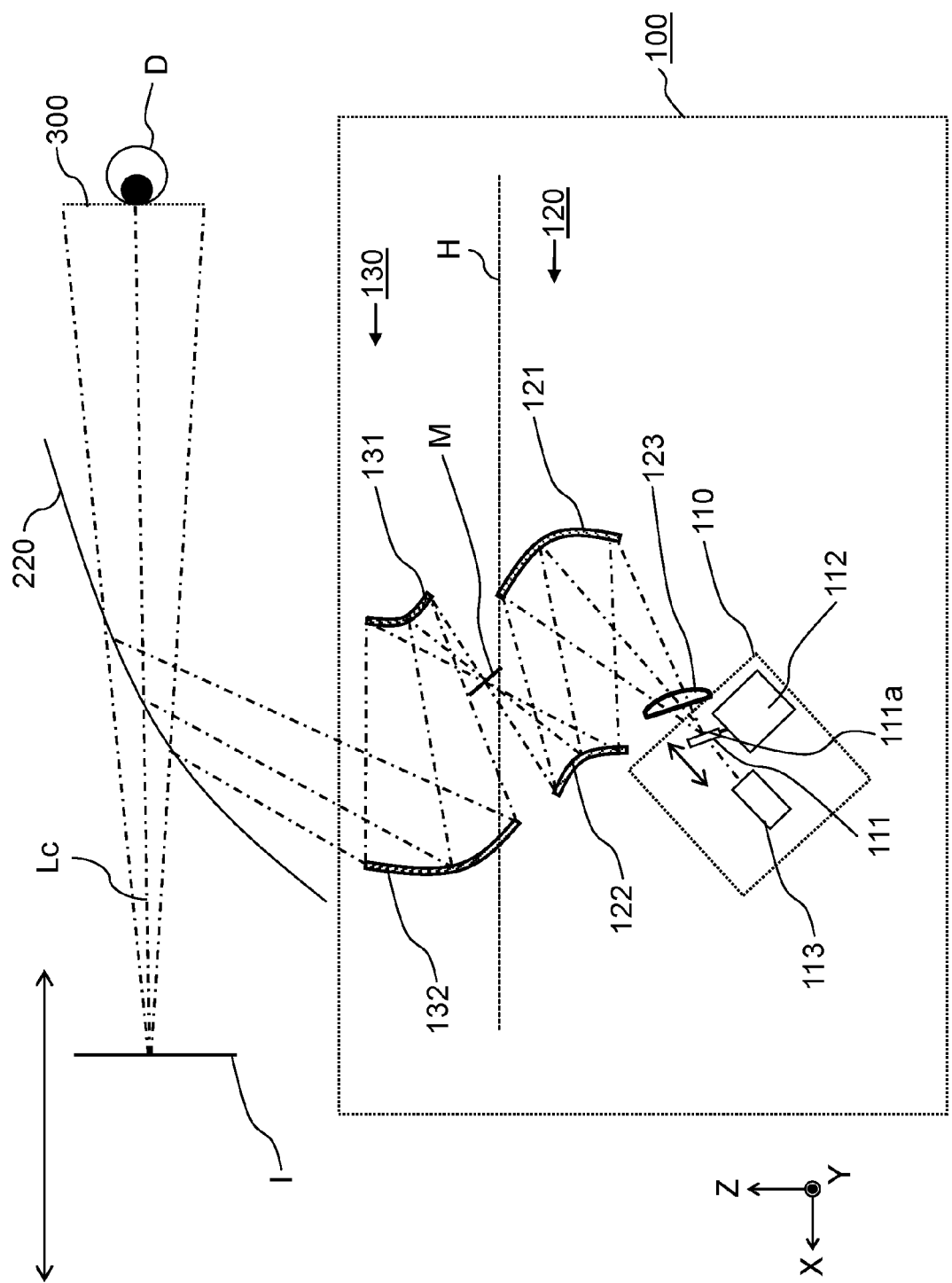
FIG. 2 is an optical cross-sectional diagram showing a structure of the head-up display according to a first exemplary embodiment.

FIG. 2 is an optical cross-sectional diagram showing the structure of head-up display 100 according to the first exemplary embodiment. As shown in FIG. 2, head-up display 100 includes display device 110, first optical system 120, and second optical system 130.

Display device 110 includes screen 111, driver 112, scanning laser 113, and a controller.

Screen 111 has display surface 111a. Display surface 111a displays various kinds of display image information. Display image information may be road traffic navigation display, a distance to a vehicle ahead, remaining battery charge of a vehicle, a current vehicle speed and the like. A material of the display surface is an optical material having a diffusing characteristic.

Scanning laser 113 is a light source of display device 110. Scanning laser 113 is disposed on the rear side of screen 111. Scanning laser 113 scans over display surface 111a of screen 111, thereby forming a displayed image on display surface 111a. The light source of display device 110 may be, in place of scanning laser 113, a projector that projects an image on screen 111.

Driver 112 drives screen 111. Here, in the beam exiting from screen 111, the beam that arrives at the center of viewpoint region 300 is referred to as main beam L. Further, in the beam exiting from screen 111, the beam that passes through the center of virtual image I and arrives at the center of viewpoint region 300 is referred to as reference main beam Lc. Driver 112 shifts screen 111 along reference main beam Lc. Shifting screen 111 along reference main beam Lc enables adjustment of the distance from observer D to virtual image I. For example, shifting screen 111 away from first optical system 120 presents virtual image I at a position farther from observer D.

Further, driver 112 shifts screen 111 in accordance with the scanning position of scanning laser 113. This allows virtual image I to be drawn on an arbitrary plane irrespective of the angle of reference main beam Lc exiting screen 111. For example, when the drawing frequency of scanning laser 113 and the oscillating frequency of screen 111 are synchronized with each other, virtual image I can be drawn on a plane that is inclined relative to observer D. This realizes the technique generally referred to as Augmented Reality (AR). That is, for example, this enables to draw, on an actual landscape, virtual image I with perspective conforming to the landscape. Further, shifting screen 111 back and forth in the direction of reference main beam Lc at several tens of hertz realizes stereoscopic display of virtual image I.

Note that, driver 112 may not only be capable of shifting screen 111 in the optical axis direction but also rotating or tilting screen 111.

First optical system 120 causes a beam exiting from an image on screen 111 to form intermediate image M, which is enlarged from the image on screen 111. First optical system 120 includes lens 123, first mirror 121, and second mirror 122. Lens 123, first mirror 121, and second mirror 122 are disposed in this order on the optical path from screen 111 to intermediate image M.

Figure 3:
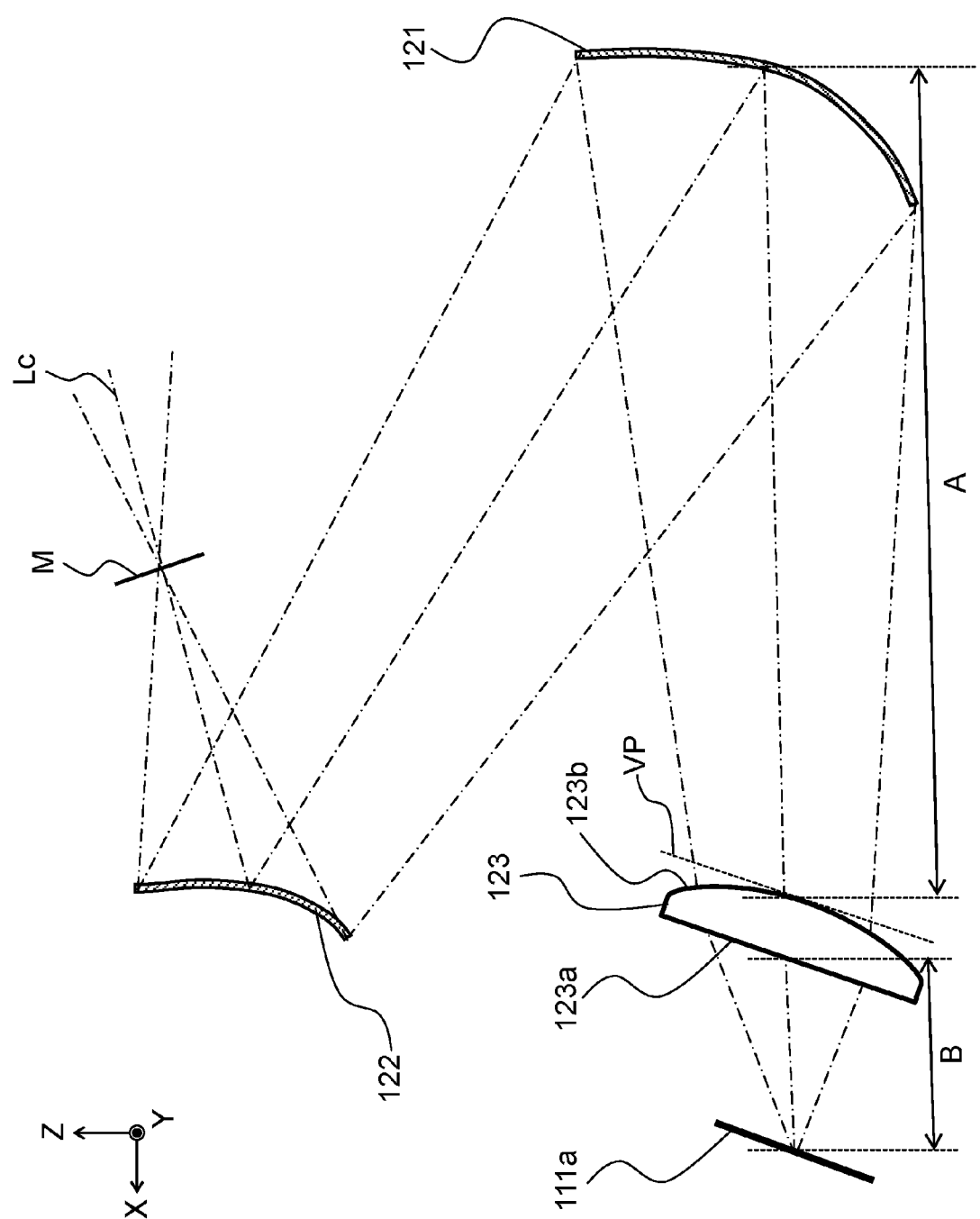
FIG. 3 is an optical cross-sectional diagram showing structures of a screen and a first optical system according to the first exemplary embodiment.

Lens 123 is, for example, a double-convex lens or a plano-convex lens. Alternatively, lens 123 may be a positive meniscus lens. Lens 123 is just required to have a shape which exhibits the light condensing effect. Thus, lens 123 can contribute to the light condensing effect for forming an intermediate image of an image displayed on screen 111, and first mirror 121 can be reduced in size. Further, lens 123 having the shape exhibiting the light condensing effect enables to reduce power of first mirror 121, which consequently reduces sensitivity to misalignment in manufacture. As shown in FIG. 3, lens 123 has input surface 123a where a beam from screen 111 enters and output surface 123b where the beam exits.

First mirror 121 is a concave mirror. The reflection surface of first mirror 121 is concave. By virtue of having the concave reflection surface, first mirror 121 can collect light so that an intermediate image of an image displayed on screen 111 is formed. First mirror 121 is greater than lens 123 in power. This smaller power of lens 123 reduces any chromatic aberration occurring at lens 123.

Further, second mirror 122 is a convex mirror. The reflection surface of second mirror 122 is convex. By virtue of having the convex reflection surface, second mirror 122 can excellently correct any asymmetric distortion due to eccentricity occurring at first mirror 121.

Intermediate image M is enlarged from an image displayed on screen 111. This enables to reduce the positive power of fourth mirror 132 of second optical system 130, which will be described later, while achieving a reduction in size of screen 111. This consequently reduces any distortion in virtual image I projected on windshield 220. Specifically, the power of first optical system 120 is desirably set so that the following condition (1) is satisfied:

$$1.4 < \beta < 4.0 \quad (1)$$

where $\beta$ is the lateral magnification of first optical system 120.

Intermediate image M is not necessarily formed as an excellent point at the position where intermediate image M is formed, and may have spherical aberration, comatic aberration, field curvature, or astigmatism.

Further, first optical system 120 is not limited to be structured by three elements, namely, first mirror 121, second mirror 122, and lens 123. First optical system 120 may be structured by just two elements, namely, first mirror 121 and lens 123, or may be structured by four or more elements.

Second optical system 130 projects intermediate image M on windshield 220. Second optical system 130 includes third mirror 131 and fourth mirror 132. Third mirror 131 is a convex mirror. The reflection surface of third mirror 131 is convex. Fourth mirror 132 is a concave mirror. The reflection surface of fourth mirror 132 is concave. By virtue of having the convex reflection surface, third mirror 131 can excellently correct any asymmetric distortion due to eccentricity occurring at fourth mirror 132. By virtue of having the concave reflection surface, fourth mirror 132 allows observer D to visually recognize virtual image I which is enlarged from intermediate image M.

In the present exemplary embodiment, first mirror 121, second mirror 122, lens 123, third mirror 131, and fourth mirror 132 all have a free-form surface. This is to correct distortion in a virtual image caused by reflection, so that excellent virtual image I is seen over the entire viewpoint region 300. However, for example, one of first mirror 121 and second mirror 122 may be a free-form surface mirror, while the other is a flat surface mirror. In this case, the free-form surface mirror exhibiting the light condensing effect is used as the concave mirror. Similarly, one of third mirror 131 and fourth mirror 132 may be a free-form surface mirror, while the other is a flat surface mirror.

[1-1-3. Optical Path]

In the following, a description will be given of the optical path of a beam that exits from screen 111 and arrives at viewpoint region 300 of observer D. A beam exiting from an image displayed on screen 111 becomes incident on first mirror 121 via lens 123. The beam is reflected by first mirror 121 and subsequently by second mirror 122, to form intermediate image M. Intermediate image M is formed midair. Intermediate image M formed by first optical system 120 is reflected by third mirror 131 and subsequently by fourth mirror 132, to be projected on windshield 220. Intermediate image M projected on windshield 220 arrives at viewpoint region 300 of observer D, and recognized as virtual image I by observer D.

Here, reference main beam Lc exits from the center of an image drawn on screen 111, and becomes incident on first mirror 121 via lens 123. Then, reference main beam Lc is reflected by first mirror 121, to arrive at the center of intermediate image M via second mirror 122. Further, reference main beam Lc is reflected by third mirror 131, to become incident on fourth mirror 132. Then, reference main beam Lc is reflected by fourth mirror 132, to be projected on windshield 220. Then, reference main beam Lc passes through the center of virtual image I projected on windshield 220, to arrive at the center of viewpoint region 300 of observer D.

Further, main beam L exits from an arbitrary point in an image drawn on screen 111, and becomes incident on first mirror 121 via lens 123. Then, main beam L is reflected by first mirror 121, and arrives, via second mirror 122, at a point of intermediate image M corresponding to the image drawn on screen 111. Further, main beam L is reflected by third mirror 131, to become incident on fourth mirror 132. Then, main beam L is reflected by fourth mirror, to be projected on windshield 220. Then, main beam L passes through an arbitrary center of virtual image I projected on windshield 220, to arrive at the center of viewpoint region 300 of observer D.

[1-1-4. Disposition Structure]

In the following, a description will be given of the disposition structure of main structure elements of display device 110, first optical system 120, and second optical system 130. Note that, the description of the disposition structure is based on that, in FIGS. 1 to 3, the positive direction on Z axis (the arrow direction) is the top direction and the negative direction is the bottom direction, and the positive direction on X axis (the arrow direction) is the left direction and the negative direction is the right direction.

(Overall Disposition Structure)

As shown in FIG. 2, in head-up display 100 according to the first exemplary embodiment, display device 110 is positioned lower than first optical system 120 and second optical system 130.

The optical distance (interval) of reference main beam Lc from first mirror 121 to second mirror 122 is shorter than that from third mirror 131 to fourth mirror 132. This achieves a reduction in size of head-up display 100.

Further, the optical distance (interval) of reference main beam Lc from screen 111 to first mirror 121 is shorter than that from first mirror 121 to intermediate image M. This achieves a reduction in size of first mirror 121, and also in size of head-up display 100.

Still further, the upper end of the reflection surface of first mirror 121 is positioned higher than the lower end of the reflection surface of fourth mirror 132. Broken line H in FIG. 2 indicates the position of the upper end of first mirror 121. Broken line H is positioned higher than the lower end of fourth mirror 132. Such disposition of first mirror 121 and fourth mirror 132 achieves a reduction in size of head-up display 100.

Still further, in the present exemplary embodiment, the power of lens 123 is adjusted so as to locate the exit pupil position of first optical system 120, that is, the center of first mirror 121, at the farthest possible position from screen 111. This reduces the difference in exiting angle between main beam L and reference main beam Lc immediately after exiting from screen 111, in the area across the center to the periphery of a displayed image region on screen 111. That is, main beam L and reference main beam Lc immediately after exiting from screen 111 can become substantially parallel to each other. This effect will be described in conjunction with condition (3) later.

(Disposition Structure of Screen)

As shown in FIG. 3, in the first exemplary embodiment, display surface 111a of screen 111 of display device 110 is directed toward lens 123. Here, reference main beam Lc exiting from screen 111 is desirably inclined relative to display surface 111a of screen 111. This prevents occurrence of stray light, which is external light entering the housing and reflected onto screen 111, and mixing with the beam of an image displayed on screen 111.

(Disposition Structure of Lens)

Lens 123 is disposed on the first mirror 121 side relative to display device 110. Light exiting from screen 111 of display device 110 enters input surface 123a of lens 123, and exits from output surface 123b of lens 123 toward first mirror 121.

Lens 123 is desirably inclined relative to reference main beam Lc. Specifically, as shown in FIG. 3, assuming that a virtual tangent plane at a point where reference main beam Lc passes in output surface 123b is tangent plane (virtual tangent plane) VP, preferably lens 123 is inclined so that tangent plane VP crosses reference main beam Lc in a direction not being perpendicular to reference main beam Lc. More specifically, tangent plane VP is desirably inclined so as to be directed downward relative to reference main beam Lc. Thus, even when external light entering the housing is reflected onto input surface 123a or output surface 123b of lens 123, the reflection light is prevented from becoming incident on first mirror 121. That is, this prevents an occurrence of stray light, which is external light mixing with a beam exiting from screen 111 and forming intermediate image M. Further, when lens 123 is disposed so that tangent plane VP is inclined toward the lower side of first mirror 121, even if external light enters lens 123, the external light entering lens 123 is not prone to become incident on any reflection mirror in addition to first mirror 121, that is, second mirror 122, third mirror 131, and fourth mirror 132. This reduces stray light. Further, at least one of input surface 123a and output surface 123b of lens 123 is a free-form surface. This facilitates setting main beam L and reference main beam Lc immediately after exiting from screen 111 to be parallel to each other.

(Disposition Structure of First Mirror)

First mirror 121 is disposed higher than display device 110 and on the observer D side. That is, in accordance with the top, bottom, right, and left directions in FIG. 2, first mirror 121 is disposed on the diagonally upper right side relative to display device 110. First mirror 121 is disposed so that its reflection surface becomes eccentric, in order to cause an image displayed on display device 110 and becoming incident on first mirror 121 via lens 123 to be reflected and incident on second mirror 122.

(Disposition Structure of Second Mirror)

Second mirror 122 is disposed lower than first mirror 121 and on virtual image I side. That is, in accordance with the top, bottom, right, and left directions in FIG. 2, second mirror 122 is disposed on the diagonally lower left side relative to first mirror 121. Second mirror 122 is disposed so that its reflection surface becomes eccentric, in order to cause the beam reflected by first mirror 121 and becoming incident on second mirror 122 to be reflected and incident on third mirror 131.

Here, in first optical system 120, screen 111, first mirror 121, and lens 123 are desirably disposed so as to satisfy the following condition (2):

$$2<A/B<200 \qquad (2)$$

where A is an optical distance of reference main beam Lc from output surface 123b to first mirror 121, and B is an optical distance of reference main beam Lc from display surface 111a to input surface 123a of lens 123.

Condition (2) defines the position of screen 111, first mirror 121, and lens 123. Satisfying condition (2) achieves a reduction in size of first optical system 120. When the upper limit of condition (2) is exceeded, first mirror 121 is excessively distanced from screen 111 and first mirror 121 must be increased in size. Thus, it becomes difficult to provide head-up display 100 of a small size. Further, when the lower limit of condition (2) is not reached, lens 123 is excessively distanced from screen 111 and lens 123 must be increased in size. Thus, it becomes difficult to provide head-up display 100 of a small size.

Further, the above-described effect can be reinforced when condition (2-1) is satisfied:

$$4<A/B<75 \qquad (2-1)$$

Still further, the above-described effect can be further reinforced when condition (2-2) is further satisfied:

$$5<A/B<50 \qquad (2-2)$$

Still further, on the optical path from display surface 111a of screen 111 to input surface 123a of lens 123, the angle formed between main beam L and reference main beam Lc desirably satisfies the following condition (3):

$$\theta max<5 \qquad (3)$$

where $\theta max$ is the maximum value of the angle [deg] formed between main beam L and reference main beam Lc on the optical path from display surface 111a of screen 111 to input surface 123a.

Condition (3) defines the beam exiting from screen 111 when observer D observes virtual image I from the center of viewpoint region 300. Condition (3) represents that main beam L and reference main beam Lc are substantially parallel to each other immediately after exiting from display surface 111a of screen 111. Main beam L and reference main beam Lc satisfying condition (3) allows the viewing angle of observer D visually recognizing virtual image I to be constant, also in the case where screen 111 is shifted along reference main beam Lc. Accordingly, observer D can visually recognize excellent virtual image I with reduced variations in shape. Further, for example, virtual image I with perspective conforming to the actual landscape can be presented.

Further, the above-described effect can be reinforced when condition (3-1) is satisfied:

$$\theta max<2 \qquad (3-1)$$

Still further, the above-described effect can be further reinforced when condition (3-2) is further satisfied:

$$\theta max<1 \qquad (3-2)$$

FIGS. 4 and 5 are diagrams showing the relationship between the angle of the beam exiting from display surface 111a of screen 111 and virtual image I. FIG. 4 shows the relationship between the position of screen 111 and virtual image I when lens 123 is structured so that the maximum value of the angle formed between main beam L and reference main beam Lc satisfies condition (3) and main beam L becomes substantially parallel to reference main beam Lc.

As shown in FIG. 4, by main beam L immediately after exiting from screen 111 set to be parallel to reference main beam Lc, the viewing angle of observer D visually recognizing virtual image I is constant when driver 112 shifts the position of screen 111 in parallel to reference main beam Lc. This reduces variations in shape of virtual image I visually recognized by observer D. Further, for example, virtual image I with perspective conforming to an actual landscape can be presented.

On the other hand, FIG. 5 shows the case where condition (3) is not satisfied and main beam L is not parallel to reference main beam Lc. When driver 112 shifts the position of screen 111 along reference main beam Lc, the viewing angle of observer D visually recognizing virtual image I changes. Accordingly, the shape of virtual image I visually recognized by observer D varies. As a result, it becomes difficult for observer D to visually recognize excellent virtual image I. Further, it is difficult to present virtual image I with perspective conforming to an actual landscape.

As described above, in the beam arriving at the center of viewpoint region 300, main beam L exiting from screen 111 is desirably parallel to reference main beam Lc.

(Disposition Structure of Third Mirror)

Third mirror 131 is disposed higher than first mirror 121. Third mirror 131 is disposed so that its reflection surface becomes eccentric, in order to cause the beam reflected by second mirror 122 to be incident on fourth mirror 132.

(Disposition Structure of Fourth Mirror)

Fourth mirror 132 is disposed on the virtual image I side relative to third mirror 131. That is, in accordance with the top, bottom, right, and left directions in FIG. 2, fourth mirror 132 is disposed on the diagonally upper left side relative to third mirror 131. Fourth mirror 132 is disposed so that its reflection surface becomes eccentric, in order to cause the reflection light from third mirror 131 to become incident on windshield 220.

[1-2. Effect and Others]

As has been described above, in the present exemplary embodiment, head-up display 100 includes display device 110, first optical system 120, and second optical system 130. Intermediate image M formed by first optical system 120 is greater than a displayed image displayed on screen 111 by display device 110. This achieves a reduction in size of first optical system 120 and second optical system 130, and also in size of the entire display device 110. Further, by virtue of first optical system 120 having lens 123, first mirror 121, and second mirror 122, a reduction in size of screen 111 is achieved while distortion in the screen is excellently corrected. Further, by virtue of first optical system 120 having lens 123, a reduction in size of first mirror 121 is achieved. Further, provision of first optical system 120 realizes a reduction in positive power of second optical system 130.

Further, by virtue of screen 111 capable of being smaller in size relative to virtual image I, the shifting amount of screen 111 in adjusting the distance between virtual image I and observer D can be reduced, and a reduction in size of driver 112 is achieved.

Note that, in the present exemplary embodiment, the shifting amount of intermediate image M is greater than the shifting amount of screen 111. This is because lateral magnification β of first optical system 120 is greater than 1. Here, the shifting amount of intermediate image M is $β^2$ times as great as the shifting amount of screen 111. In the first exemplary embodiment, not intermediate image M but screen 111 is shifted, whereby a reduction in shifting amount and size of driver 112 is achieved.

Further, in the present exemplary embodiment, the power of lens 123 is designed to be capable of setting main beam L and reference main beam Lc immediately after exiting from display surface 111a to be parallel to each other. This provides a constant viewing angle of observer D visually recognizing virtual image I when display surface 111a is shifted along reference main beam Lc. Accordingly, virtual image I with reduced variations in shape can be presented. Further, virtual image I with perspective conforming to an actual landscape can be presented.

Second Exemplary Embodiment

Figure 6:
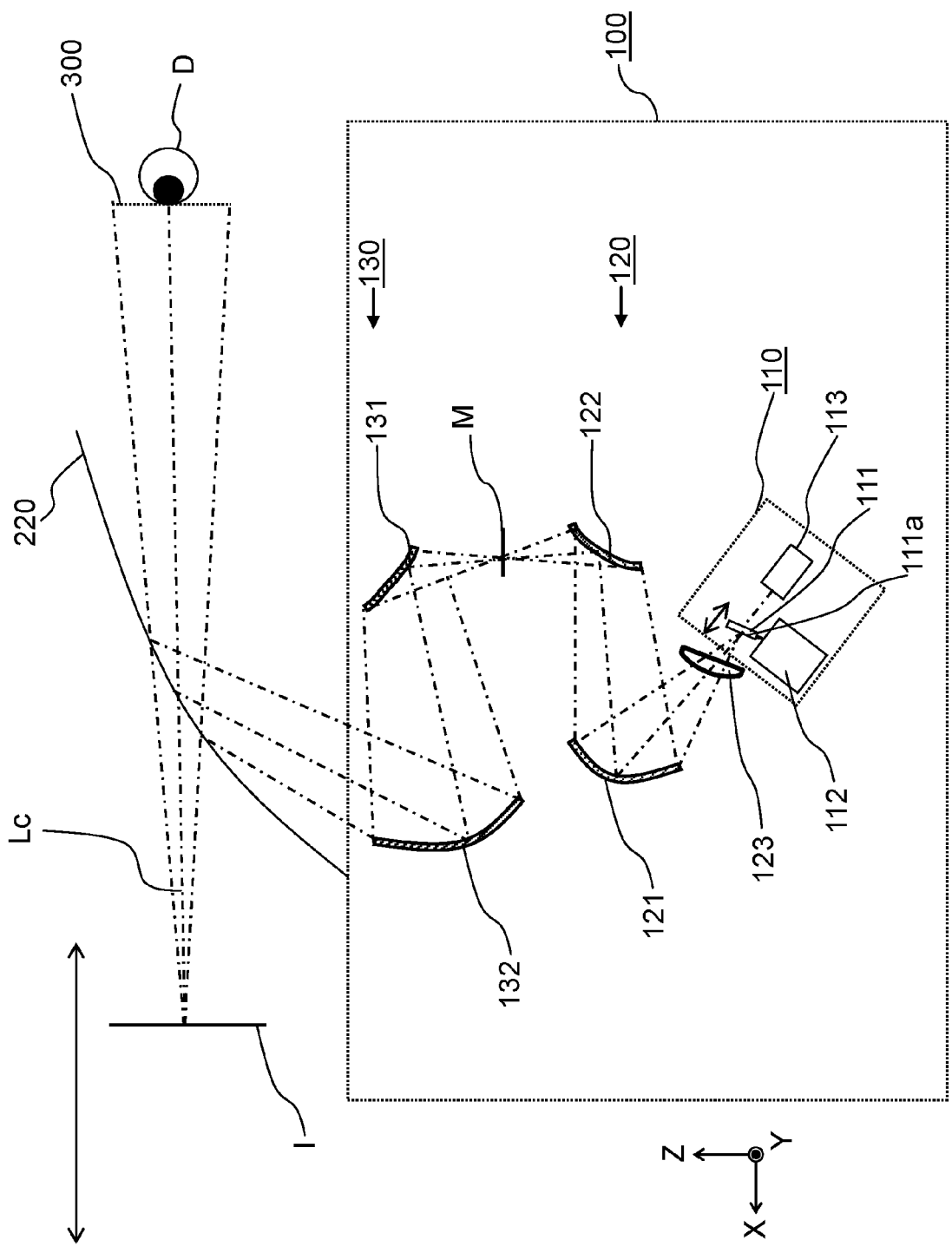
FIG. 6 is an optical cross-sectional diagram showing a structure of a head-up display according to a second exemplary embodiment.

In the following, with reference to FIG. 6, a description will be given of a second exemplary embodiment. Note that, the present exemplary embodiment is different from the first exemplary embodiment in the disposition position of first optical system 120. Other structure is similar to the first exemplary embodiment. Accordingly, in the following, a description will be mainly given of the difference, and the description of the similar structure will be omitted.

First mirror 121 of head-up display 100 according to the second exemplary embodiment is disposed at the position different from the first exemplary embodiment. First mirror 121 according to the second exemplary embodiment is disposed higher in the vertical direction in FIG. 6 (in the positive direction on Z axis) than display device 110, and on the virtual image I side (in the positive direction on X axis).

In head-up display 100 according to the second exemplary embodiment, display surface 111a of screen 111 is directed in the forward direction of the vehicle. Thus, scanning laser 113 can be disposed on the observer D side, and interference with any structure on the front side of the vehicle can be avoided.

NUMERICAL EXAMPLES

In the following, with reference to FIGS. 7 to 17, numerical examples corresponding to the first and second exemplary embodiments will be shown.

Hereinafter, a description will be given of specific examples of the display device of the present technique. Note that, in the following Examples, the unit of length in tables is (mm) and the unit of angle is (degrees). Further, the free-form surface is defined by the following Mathematic Expression 1

$$z = \frac{cr^2}{1 + \sqrt{1 - (1+k)c^2r^2}} + \sum_{j=2} C_j x^m y^n \qquad \text{[Mathematic Expression 1]}$$

$$j = \frac{(m+n)^2 + m + 3n}{2} + 1$$

where z is a sag at position (x, y) from axes defining a surface, r is a radius of curvature at the origin on the axes defining a surface, c is a curvature at the origin on the axes defining a surface, k is a Korenich constant, and Cj is a coefficient of monomial $x^m y^n$.

Further, in Examples, the coordinate origin being the reference is the center of an image (display surface 111a) displayed on display device 110. In tables of FIGS. 7 and 12, the horizontal direction in display surface 111a is X-axis, the vertical direction in display surface 111a is Y-axis, and the direction perpendicular to display surface 111a is Z-axis.

Further, a toroidal surface is formed by a locus of a contour on an xz plane defined by the following Mathematic Expression 2 when the contour is rotated about an axis which is translated in X-axis from the origin to a position distanced by a radius of curvature ry.

$$z = \frac{c_x x^2}{1 + \sqrt{1 - (1+k)c_x^2 x^2}} \qquad \text{[Mathematic Expression 2]}$$

Further, in eccentricity data, ADE refers to the amount of rotating a mirror or a lens from the Z-axis direction to the Y-axis direction about X-axis; BDE refers to the amount of rotating a mirror or a lens from the X-axis direction to the Z-axis direction about Y-axis; and CDE refers to the amount of rotating a mirror or a lens from the X-axis direction to the Y-axis direction about Z-axis.

Example 1

FIGS. 7 to 11 show data of the optical system of head-up display 100 of Example 1 (the first exemplary embodiment). Example 1 shows an example in the structure of the first exemplary embodiment. FIGS. 7 to 11 show data of the specific optical system. FIG. 7 shows eccentricity data of the surfaces of the optical elements of head-up display 100. Surface number 1 is the number of the display surface of screen 111. Surface number 2 is the number of input surface 123a of lens 123, and the surface number 3 is the number of output surface 123b of lens 123. Surface number 4 is the number of the reflection surface of first mirror 121. Surface number 5 is the number of the reflection surface of second mirror 122. Surface number 6 is the number of the reflection surface of third mirror 131. Surface number 7 is the number of the reflection surface of fourth mirror 132. Surface number 8 is the number of the projection surface of windshield 220. Surface number 9 is the number of the center of viewpoint region 300 of observer D. FIG. 8 shows the radius of curvature of the surfaces. FIGS. 9 to 11 show polynomial coefficients that represent the free-form surfaces of the surfaces.

Example 2

FIGS. 12 to 16 are data of the optical system of head-up display 100 of Example 2 (the second exemplary embodiment). Numerical Example 2 shows an example in the structure of the second exemplary embodiment. FIGS. 12 to 16 show data of the specific optical system. FIG. 12 shows eccentricity data of the surfaces of the optical elements of head-up display 100. The manner of numbering the surface number is similar to that in Numerical Example 1. FIG. 13 shows the radius of curvature of the surfaces. FIGS. 14 to 16 show polynomial coefficients that represent the free-form surface of the surfaces.

FIG. 17 shows data representing the size of virtual image I and the distance from observer D to virtual image I in each of Example 1 and Example 2. In FIG. 17, X and Y are directions defining the surfaces of windshield 220. The X direction is the lateral (horizontal) direction, and the Y direction is the vertical direction.

In the following Table 1, corresponding values of conditional expressions (1) to (3) of the first and second exemplary embodiments are shown.

TABLE 1

|  | Example 1 | Example 2 |
|---|---|---|
| Conditional Expression (1) | 1.81 | 2.12 |
| Conditional Expression (2) | 49.29 | 5.11 |
| Conditional Expression (3) | 0.73 | 0.84 |

Other Exemplary Embodiments

In the foregoing, the description has been given of the first and second exemplary embodiments as illustrations of the technique disclosed in the present application. However, the technique disclosed in the present disclosure is not limited thereto, and is applicable to any exemplary embodiment obtained by making changes, replacement, addition, omission and the like. Further, it is also possible to newly obtain an exemplary embodiment through combination of the structure elements described in the first and second exemplary embodiments.

In the first and second exemplary embodiments, display device 110 has been described to use a projector projecting an image on screen 111 or a scanning laser. However, it is also possible to dispense with the projector or the scanning laser, and to use a liquid crystal display apparatus (a liquid crystal display), an organic light emitting diode (an electroluminescence), a plasma display or the like as screen 111.

In the first and second exemplary embodiments, second optical system 130 is not limited to be structured by two mirrors, namely, third mirror 131 and fourth mirror 132, and may be structured by refractive optical elements such as lens elements having the similar function, and may be structured by only fourth mirror 132.

In the first and second exemplary embodiments, while a rotationally asymmetric mirror is employed as third mirror 131, it is also possible to employ a mirror having a so-called saddle surface shape in which the sign of curvature is opposite between the X direction and the Y direction.

In the first and second exemplary embodiments, while a rotationally asymmetric mirror is employed as second mirror 122, it is also possible to employ a mirror having a so-called saddle surface shape in which the sign of curvature is opposite between the X direction and the Y direction.

In the first and second exemplary embodiments, while a rotationally asymmetric free-form surface lens is employed as lens 123, the present disclosure is not limited thereto. Lens 123 may be a spherical lens, an aspheric lens, a cylindrical lens, a toroidal lens, an anamorphic lens, or Fresnel lens. In sum, lens 123 is just required to be capable of setting main beam L and reference main beam Lc immediately after exiting screen 111 to be parallel to each other.

In the first and second exemplary embodiments, while lens 123 has been described to exhibit the refractive effect, it may exhibit the diffractive effect.

In the first and second exemplary embodiments, while lens 123 has been described to have a shape that exhibits the light condensing effect, the light condensing effect may not be exhibited over the entire lens surface, and the lens may have a surface shape which partially exhibits the diverging effect. In the first and second exemplary embodiments, while screen 111 has been described to be shifted back and forth in the direction of reference main beam Lc, the shifting direction is not necessarily identical to the direction of reference main beam Lc, and the shifting direction is just required to include the direction vector of reference main beam Lc.

Note that, the exemplary embodiments described above are illustrations of the technique of the present disclosure. Therefore, various changes, replacement, addition, or omission may be made to the exemplary embodiments within the scope of claims for patent or their equivalents.

The present disclosure is applicable to a head-up display that projects on a reflective transparent member. Specifically, the present disclosure is applicable to a head-up display mounted on a mobile object or the like having a windshield.

What is claimed is:

1. A head-up display that allows an observer to visually recognize a virtual image in a viewpoint region of the observer, the head-up display comprising:
a display device that has a display surface and displays an image on the display surface; and
a first optical system that has a concave mirror, and a lens condensing a light and disposed between the concave mirror and the display surface, the first optical system causing a beam exiting from the display surface to form an intermediate image via the lens and the concave mirror, the intermediate image being enlarged from the image displayed on the display surface.

2. The head-up display according to claim 1, wherein
the lens has an input surface where the beam enters and an output surface where the beam exits, and
the lens and the concave mirror are adjacent to each other on an optical path of the beam, and a distance from the display surface to the input surface is smaller than a distance from the output surface to the concave mirror.

3. The head-up display according to claim 1, wherein
the lens has an input surface where the beam enters and an output surface where the beam exits,
the lens and the concave mirror are adjacent to each other on an optical path of the beam, and
when, in the beam, a beam that passes through a center of the virtual image and arrives at a center of the viewpoint region is a reference main beam, a following condition (2) is satisfied:

$$2<A/B<200 \qquad (2)$$

where A is an optical distance of the reference main beam from the output surface to the concave mirror, and B is an optical distance of the reference main beam from the display surface to the input surface.

4. The head-up display according to claim 1, wherein the concave mirror is greater than the lens in optical power.

5. The head-up display according to claim 1, wherein
the lens has an output surface where the beam exits, and
when, in the beam, a beam that passes through a center of the virtual image and arrives at a center of the viewpoint region is a reference main beam, and a virtual plane in contact with the output surface at a point in the output surface where the reference main beam passes is a virtual tangent plane, the virtual tangent plane is inclined relative to the reference main beam.

6. The head-up display according to claim 5, wherein when a position where the intermediate image is formed is on an upper side relative to the lens, the virtual tangent plane is directed downward relative to the reference main beam.

7. The head-up display according to claim 1, wherein the lens has an input surface where the beam enters, when, in the beam, a beam that arrives at a center of the viewpoint region is a main beam and a beam that passes through a center of the virtual image and arrives at the center of the viewpoint region is a reference main beam, a following condition (3) is satisfied:

$$\theta max < 5 \tag{3}$$

where $\theta max$ is a maximum value of an angle formed between the main beam and the reference main beam immediately after exiting from the display surface.

8. The head-up display according to claim 1, wherein the lens has an input surface where the beam enters, and when, in the beam, a beam that arrives at a center of the viewpoint region is a main beam and a beam that passes through a center of the virtual image and arrives at the center of the viewpoint region is a reference main beam, the lens is configured to set the main beam and the reference main beam to be parallel to each other on an optical path of the beam from the display surface to the input surface.

9. The head-up display according to claim 1, wherein the intermediate image is formed midair.

10. The head-up display according to claim 1, further comprising a second optical system that is disposed on an optical path of the beam from the intermediate image to the viewpoint region and projects the intermediate image,
wherein an image projected by the second optical system is visually recognized as the virtual image by the observer in the viewpoint region.

11. The head-up display according to claim 1, wherein the display surface shifts along the reference main beam.

12. A mobile object comprising:
the head-up display according to claim 1; and
a windshield.

* * * * *